US011557991B2

(12) United States Patent
Dai et al.

(10) Patent No.: US 11,557,991 B2
(45) Date of Patent: Jan. 17, 2023

(54) CONTROL METHOD OF IMPACT POWER TOOL

(71) Applicant: MOBILETRON ELECTRONICS CO., LTD., Taichung (TW)

(72) Inventors: Po-Kai Dai, Pingtung County (TW); Wei-Jia Liou, Changhua County (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 37 days.

(21) Appl. No.: 17/368,492

(22) Filed: Jul. 6, 2021

(65) Prior Publication Data
US 2022/0014128 A1    Jan. 13, 2022

(30) Foreign Application Priority Data
Jul. 8, 2020 (TW) ................. 109123033

(51) Int. Cl.
H02P 6/17 (2016.01)
H02P 6/15 (2016.01)
H02P 6/28 (2016.01)
B25B 23/147 (2006.01)
H02P 6/24 (2006.01)
B25B 21/02 (2006.01)

(52) U.S. Cl.
CPC ............ H02P 6/17 (2016.02); B25B 23/1475 (2013.01); H02P 6/15 (2016.02); H02P 6/24 (2013.01); H02P 6/28 (2016.02); B25B 21/02 (2013.01)

(58) Field of Classification Search
CPC ...... H02P 6/17; H02P 6/15; H02P 6/24; H02P 6/28; B25B 23/1475; B25B 21/02

USPC ........................................................ 318/17, 3
See application file for complete search history.

(56) References Cited

U.S. PATENT DOCUMENTS 10,171,011 B2 * 1/2019 Takano ................. H02P 1/028

FOREIGN PATENT DOCUMENTS

| CN | 101678543 A | 3/2010 |
| CN | 105246654 A | 1/2016 |
| TW | 201406506 A | 2/2014 |
| TW | 201729957 A | 9/2017 |
| WO | 2020129859 A1 | 6/2020 |

OTHER PUBLICATIONS

English abstract for TW201729957, Total of 1 page.
(Continued)

Primary Examiner — David Luo
(74) Attorney, Agent, or Firm — Apex Juris, PLLC; Tracy Heims; R Wylie

(57) ABSTRACT

A control method of an impact power tool includes: control a motor to rotate; continuously obtain a rotation speed signal based on a detecting result of a rotation speed detecting device and obtain a current signal based on a detecting result of a current detecting device; obtain a rotating time of each of rotation angles of the motor based on a variation of pulse waves of rotation speed signal and obtain the motor current based on the current signal; determine a number of impact that the impact mechanism produces based on a variation of the rotating time and a variation of the motor current; control the motor to stop rotating when the number of impact reaches a predetermined number. In this way, an output torque outputted by the impact power tool could be accurately controlled.

13 Claims, 11 Drawing Sheets

(56) References Cited

OTHER PUBLICATIONS

English abstract for CN105246654, Total of 1 page.
English abstract for CN101678543, Total of 1 page.
English abstract for TW201406506, Total of 1 page.
English abstract for WO2020129859, Total of 1 page.
Search report for TW109123033, dated Feb. 25, 2021, Total of 1 page.

* cited by examiner

CONTROL METHOD OF IMPACT POWER TOOL

BACKGROUND OF THE INVENTION

Technical Field

The present invention relates generally to a power tool, and more particularly to a control method of an impact power tool.

Description of Related Art

Typically, impact power tools include a motor and an impact mechanism, wherein the motor drives the impact mechanism to generate impact. The greater the number of impacts, the greater the torque output to the workpiece. A conventional impact power tool can only output a fixed torque. However, the fixed torque cannot be applied to workpieces of various sizes. When a torque required to tighten the workpiece is greater than a torque value output by the impact power tool, the workpiece cannot be tightened, while when the torque required to tighten the workpiece is less than the torque value output by the impact power tool, the workpiece will be damaged.

In light of this, impact power tools with adjustable torque output have also been developed. A conventional impact power tool with adjustable torque output adjusts the output torque by setting different impact times after generating impact, wherein the longer the set impact time, the higher the number of impacts and the higher the torque generated. However, conventional impact power tools lack sufficient torque control to accurately generate the number of impacts by the impact mechanism during impact and associated output torque.

BRIEF SUMMARY OF THE INVENTION

In view of the above, the primary objective of the present invention is to provide a control method of an impact power tool, which could accurately control an output torque.

The present invention provides a control method of an impact power tool, wherein the impact power tool includes a motor, an impact mechanism, a rotation speed detecting device, and a current detecting device. The impact mechanism is connected to the motor and is driven by the motor to rotate. The rotation speed detecting device is adapted to detect a rotation speed of the motor, and the current detecting device is adapted to detect a motor current when the motor operates. The control method includes following steps.

A. control the motor to rotate;

B. continuously obtain the rotation speed signal based on a detecting result of the rotation speed detecting device and obtain the current signal based on a detecting result of the current detecting device, wherein the rotation speed signal has a plurality of pulse waves corresponding to a plurality of rotation angles of the motor; obtain a rotating time of each of the rotation angles of the motor based on a variation of the pulse waves and obtain the motor current based on the current signal;

C. determine that the impact mechanism produces an impact based on a variation of the rotating time of the rotation speed signal and a variation of the motor current of the current signal, and obtaining a number of impact by summing the impacts that the impact mechanism produces;

D. stopping the motor from rotating when the number of impact reaches a predetermined number.

With the aforementioned design, the number of impact that the impact mechanism produces could be accurately determined through the motor current and the rotating time of the rotation speed signal, and the motor could be controlled to stop rotating when the number of impact reaches the required predetermined number, thereby accurately control the output torque outputted by the impact power tool.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
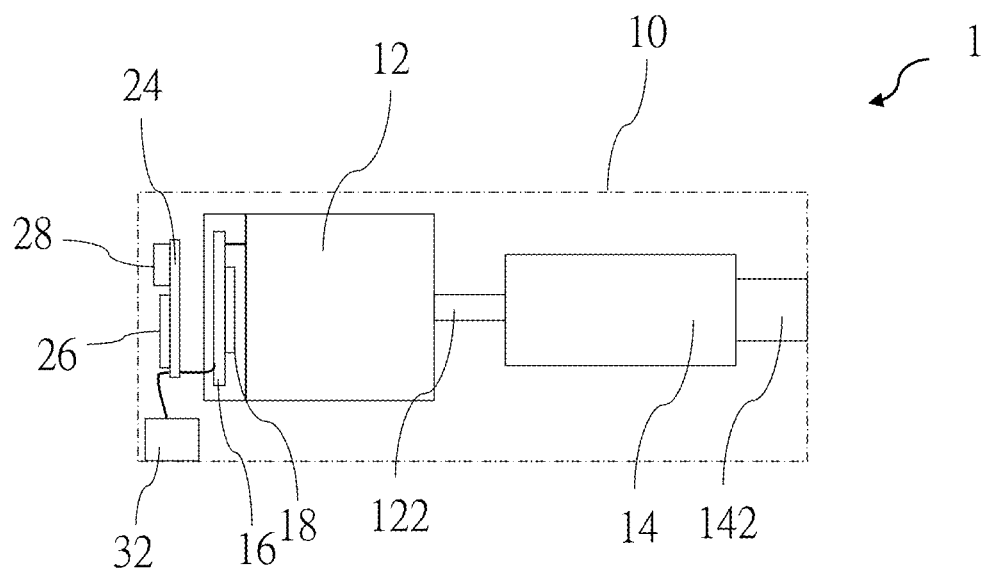
FIG. 1 is a schematic view of the impact power tool according to a first embodiment of the present invention.
Figure 2:
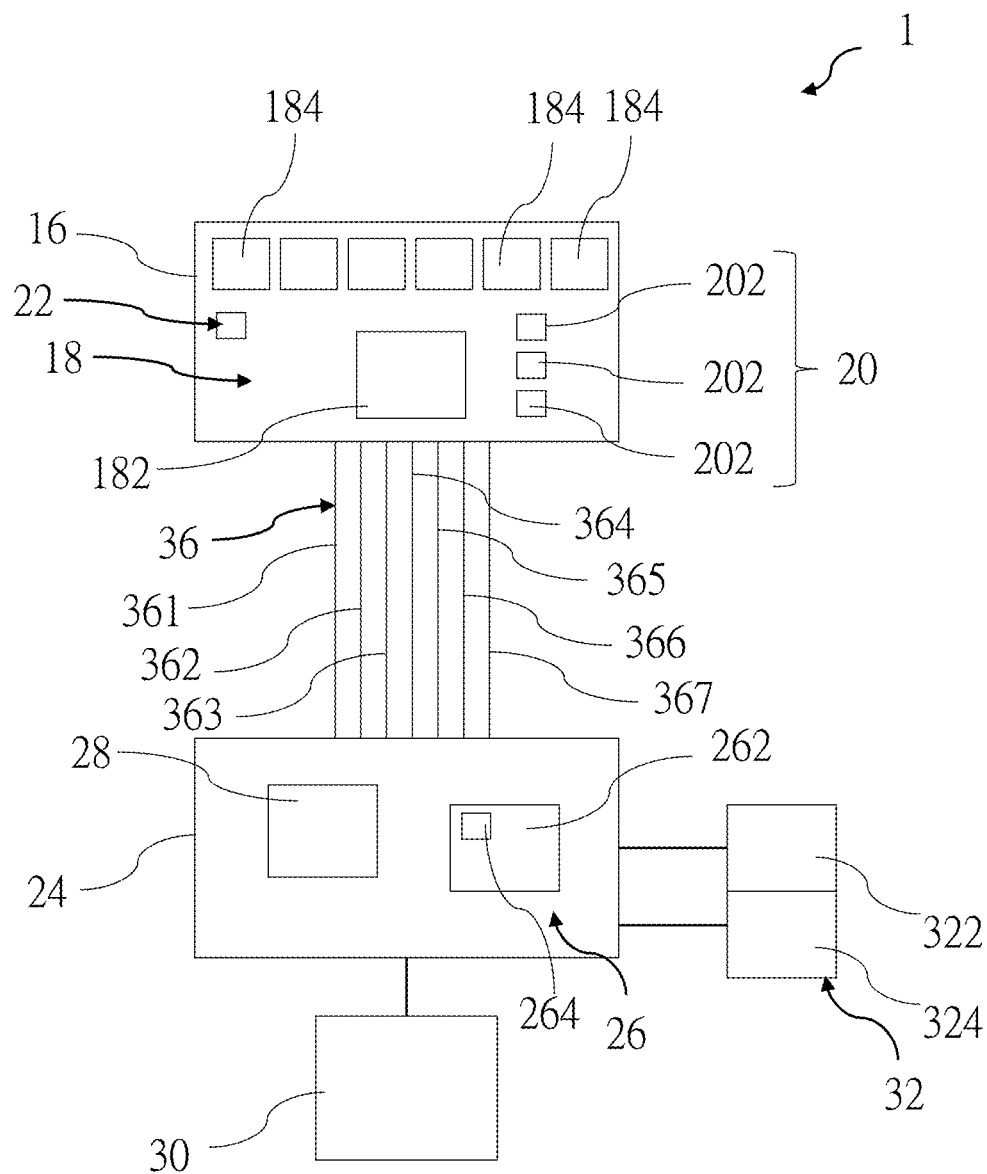
FIG. 2 is a block diagram of the impact power tool according to the first embodiment of the present invention.

An impact power tool 1 according to a first embodiment of the present invention is illustrated in FIG. 1 and FIG. 2, wherein the impact power tool 1 is an electric impact wrench as an example. The impact power tool 1 includes a casing 10, a motor 12, an impact mechanism 14, a first circuit board 16, and a second circuit board 24, wherein the motor 12, the impact mechanism 14, the first circuit board 16, and the second circuit board 24 are disposed in the casing 10.

A rotating shaft 122 of the motor 12 is connected to the impact mechanism 14. The motor 12 is controlled to rotate. In the current embodiment, the motor 12 is a three-phase brushless DC motor as an example.

The impact mechanism 14 is driven by the motor 12 to rotate and is connected to an output shaft 142, wherein the output shaft 142 is adapted to be connected to a workpiece to be driven. During the process of a rotation of the impact mechanism 14, the impact mechanism 14 will produce an impact when the output shaft 142 receives a certain resistance, wherein each impact applies a predetermined torque to the workpiece.

A first control device 18, a rotation speed detecting device 20, and a current detecting device 22 are disposed on the first circuit board 16.

The first control device 18 is electrically connected to the motor 12 for controlling an operation of the motor 12. In the current embodiment, the first control device 18 includes a first controller 182 and a plurality of commutation switching elements 184, wherein the first controller 182 could be a microcontroller, and is electrically connected to the commutation switching elements 184. In the current embodiment, the commutation switching elements 184 are six MOSFETs and are electrically connected to a stator of the motor 12.

The rotation speed detecting device 20 is adapted to detect a rotation speed of the motor 12 and output a rotation speed signal. In the current embodiment, the rotation speed detecting device 20 includes a plurality of Hall detectors 202 electrically connected to the first controller 182, wherein the Hall detectors 202 includes three Hall detectors 202 which are respectively adapted to detect a position of a rotor of the motor 12. An output of each of the Hall detectors 202 varies between a first voltage level and a second voltage level, wherein the Hall detectors 202 respectively output a pulse wave in sequence when the rotor rotates by per 120 degrees. In other words, the rotation speed signal includes the outputs of the three Hall detectors 202, wherein a variation of each of the pulse waves represents the motor 12 rotates a rotation angle which is 120 degrees as an example. In the current embodiment, the first voltage level is a low voltage level as an example, and the second voltage level is a high voltage level as an example.

The second circuit board 24 is electrically connected to a battery 30 and an operation interface 32, and a second control device 26 and a monitor 28 are disposed on the second circuit board 24, wherein the battery 30 provides an electricity to the second circuit board 24. The operation interface 32 is electrically connected to the second control device 26 and includes an activating switch 322 and a level selecting device 324, wherein the activating switch 322 is operated by a user to output a first activating signal or a second activating signal to the second control device 26. When the user lightly presses the activating switch 322, the first activating signal is outputted, while when the user heavily presses the activating switch 322, the second activating signal is outputted.

The level selecting device 324 could be a switch and is operated by a user to output a level selecting signal to the second control device 26, thereby selecting one of a plurality of different torque levels.

The second control device 26 includes a second controller 262 and a storage unit 264, wherein the second controller 262 could be a microcontroller and is electrically connected to the monitor 28. In the current embodiment, the storage unit 264 is a built-in memory of the second controller 262, and stores a plurality of predetermined numbers respectively corresponding to the torque levels. The higher the torque levels are, the more the predetermined numbers are. The second controller 262 could correspondingly select one of the predetermined numbers based on the level selecting signal.

The second circuit board 24 is electrically connected to the first circuit board 16 via a transmission line group 36. A plurality of transmission lines of the transmission line group 36 includes a power cord 361, a ground wire 362, a command transmission line 363, a brake signal line 364, a feedback signal line 365, a current signal line 366, and a rotation speed signal line 367. The power cord 361 and the ground wire 362 are adapted to transmit an electricity from the second circuit board 24 to the first circuit board 16. The second control device 26 communicates with the first control device 18 via the command transmission line 363, the brake signal line 364, the feedback signal line 365, the current signal line 366, and the rotation speed signal line 367.

The second control device 26 transmits a pulse width modulation signal to the first control device 18 via the command transmission line 363, wherein the pulse width modulation signal is used as a command for controlling a rotation mode of the motor 12. More specifically, a pulse frequency of the pulse width modulation signal represents a rotation direction of the motor 12, and a duty cycle of the pulse width modulation signal represents a rotation speed of the motor 12, wherein the first control device 18 analyzes the pulse frequency of the pulse width modulation signal to correspondingly control the rotation direction of the motor 12, and analyzes the duty cycle to correspondingly control the rotation speed of the motor 12. In an embodiment, the command transmission line 363 could be replaced by two transmission lines, wherein one of the transmission lines transmits a rotation direction command, while the other one of the transmission lines transmits a rotation speed command, thereby the first control device 18 controls the rotation direction of the motor 12 based on the rotation direction command and controls the rotation speed of the motor 12 based on the rotation speed command.

The second control device 26 transmits a braking command via the brake signal line 364, and the first control device 18 controls the motor 12 to stop rotating based on the braking command.

The first control device 18 correspondingly transmits an impact signal via the feedback signal line 365, wherein the impact signal corresponds to an active state of the impact mechanism. The way of generating the impact signal will be described in detail later.

The current detecting device detects a motor current Im when the motor 12 operates and outputs a current signal to the first control device, wherein the current signal could be transmitted to the second control device via the current signal line 366.

The feedback signal line 365 of the transmission line group 36 is a first transmission line defined in the present invention, and the brake signal line 364 is a second transmission line defined in the present invention.

Figure 3:
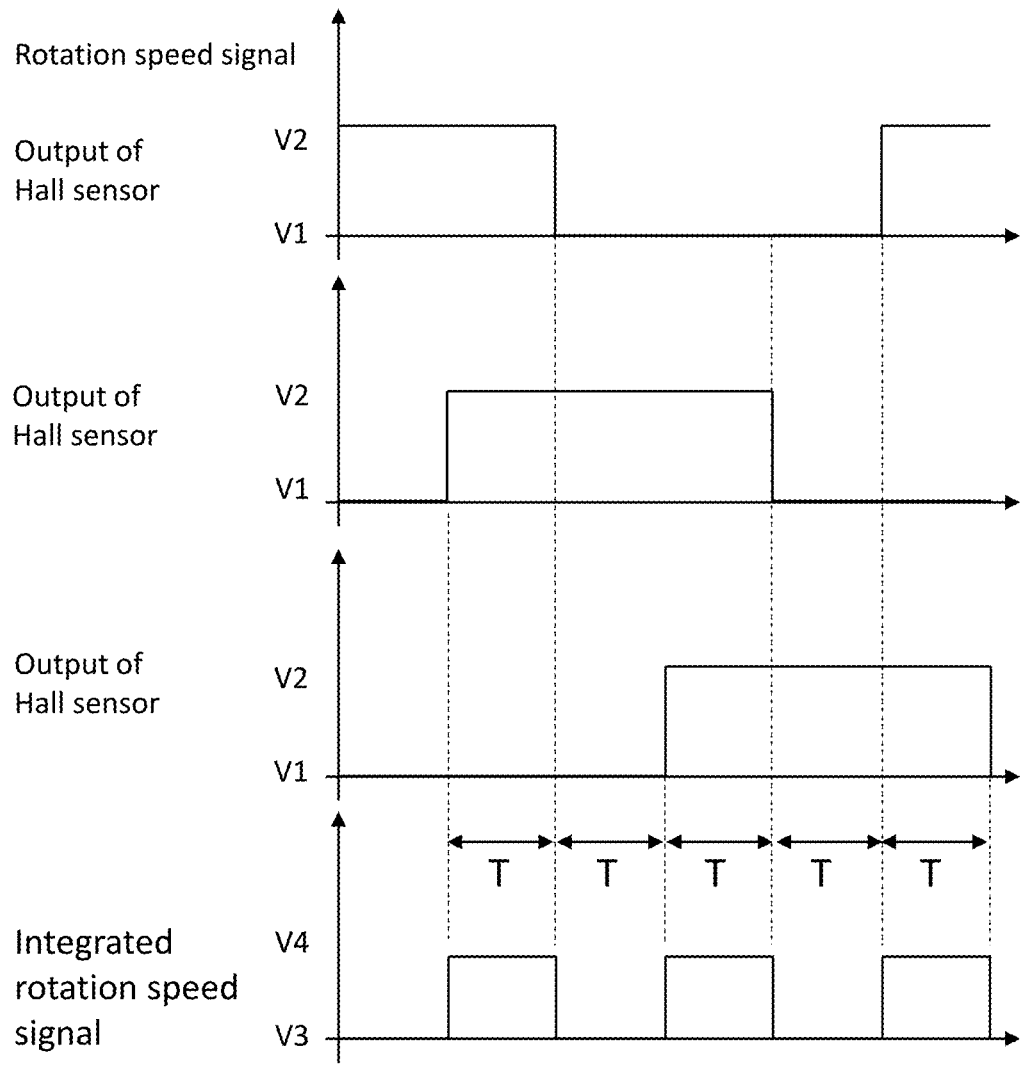
FIG. 3 is a waveform diagram of the rotation speed signal according to the first embodiment of the present invention.

In the current embodiment, since the original rotation speed signal includes the outputs of the three Hall detectors 202, the first controller 182 converts the outputs of the three Hall detectors 202 into an integrated rotation speed signal for facilitating the second control device 26 to determine the rotation speed, wherein the integrated rotation speed signal is transmitted to the second control device 26 via the rotation speed signal line 367 for the second control device 26 to determine the rotation speed of the motor 12. Referring to FIG. 3, in the current embodiment, the first controller 182 changes the integrated rotation speed signal from a third voltage level V3 to a fourth voltage level V4 when the output of each of the Hall detectors 202 varies from the first voltage level V1 to the second voltage level V2, and the first controller 182 changes the integrated rotation speed signal from the fourth voltage level V4 to the third voltage level V3 when the output of each of the Hall detectors 202 varies from the second voltage level V2 to the first voltage level V1. In the current embodiment, the third voltage level V3 is a low voltage level as an example, and the fourth voltage level V4 is a high voltage level as an example. In other words, every time the rotor rotates 120 degrees, the integrated rotation speed signal will have a pulse wave change of one cycle, and every time the rotor rotates for one revolution, the integrated rotation speed signal will have a pulse wave of three cycles. The second control device 42 could calculate the rotation speed of the rotor based on a pulse wave cycle of the integrated rotation speed signal. By Integrating the outputs of the three Hall detectors 202 into one could effectively reduce the number of transmission lines in the transmission line group 36.

A pulse wave of the original rotation speed signal or one cycle of a pulse wave change of the integrated rotation speed signal represents a rotation angle of the rotating shaft 122 of the motor 12. In the current embodiment, the rotation angle that one cycle of the pulse wave change corresponds is 120 degrees.

In an embodiment, the first controller 182 could transmit the output of one of the Hall detectors 202 in the original rotation speed signal to the second control device 26 via the rotation speed signal line 367, and the second control device 26 calculates the rotation speed of the rotor based on the pulse wave cycle outputted by one of the Hall detectors 202. In addition, if the second control device 26 does not need to obtain the rotation speed, the rotation speed signal line 367 could be omitted.

In an embodiment, the first control device 18 and the second control device 26 could be integrated into a control device and located on the same circuit board.

Figure 4:
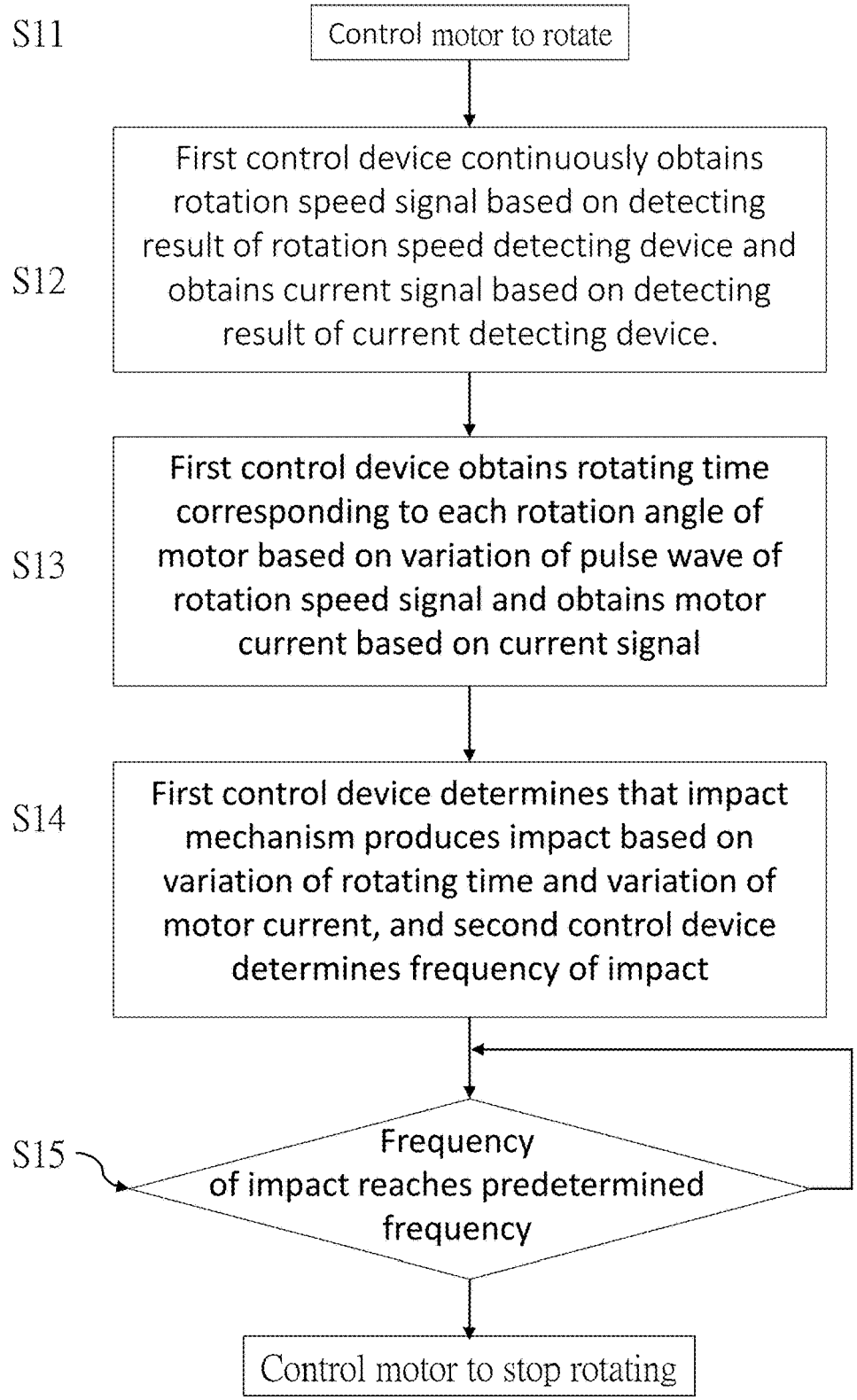
FIG. 4 is a flowchart of the control method of the impact power tool according to the first embodiment of the present invention.

With the aforementioned structures of the impact power tool 1, a control method shown in FIG. 4 could be applied, wherein the control method includes following steps.

Step S11: control the motor 12 to rotate.

In the current embodiment, a user operates the operation interface 32 to select the required one of the torque levels through the level selecting device 324, and the level selecting device 324 correspondingly outputs the level selecting signal to the second control device 26. The second controller 262 retrieves the corresponding one of the predetermined numbers from the storage unit 264 based on the required torque level, and displays the level, which is selected, via the monitor 28.

When the user lightly presses the activating switch 322, the activating switch 322 outputs the first activating signal to the second controller 262, and the second controller 262 correspondingly outputs the pulse width modulation signal to the first control device 18 via the command transmission line 363, and the first controller 182 controls the commutation switching elements 184 based on the pulse frequency and the duty cycle of the pulse width modulation signal, thereby controlling the motor 12 to rotate. At this time, the rotating shaft 122 of the motor 12 drives the impact mechanism 14 to rotate, and the output shaft 142 drives the workpiece to rotate.

Figure 5:
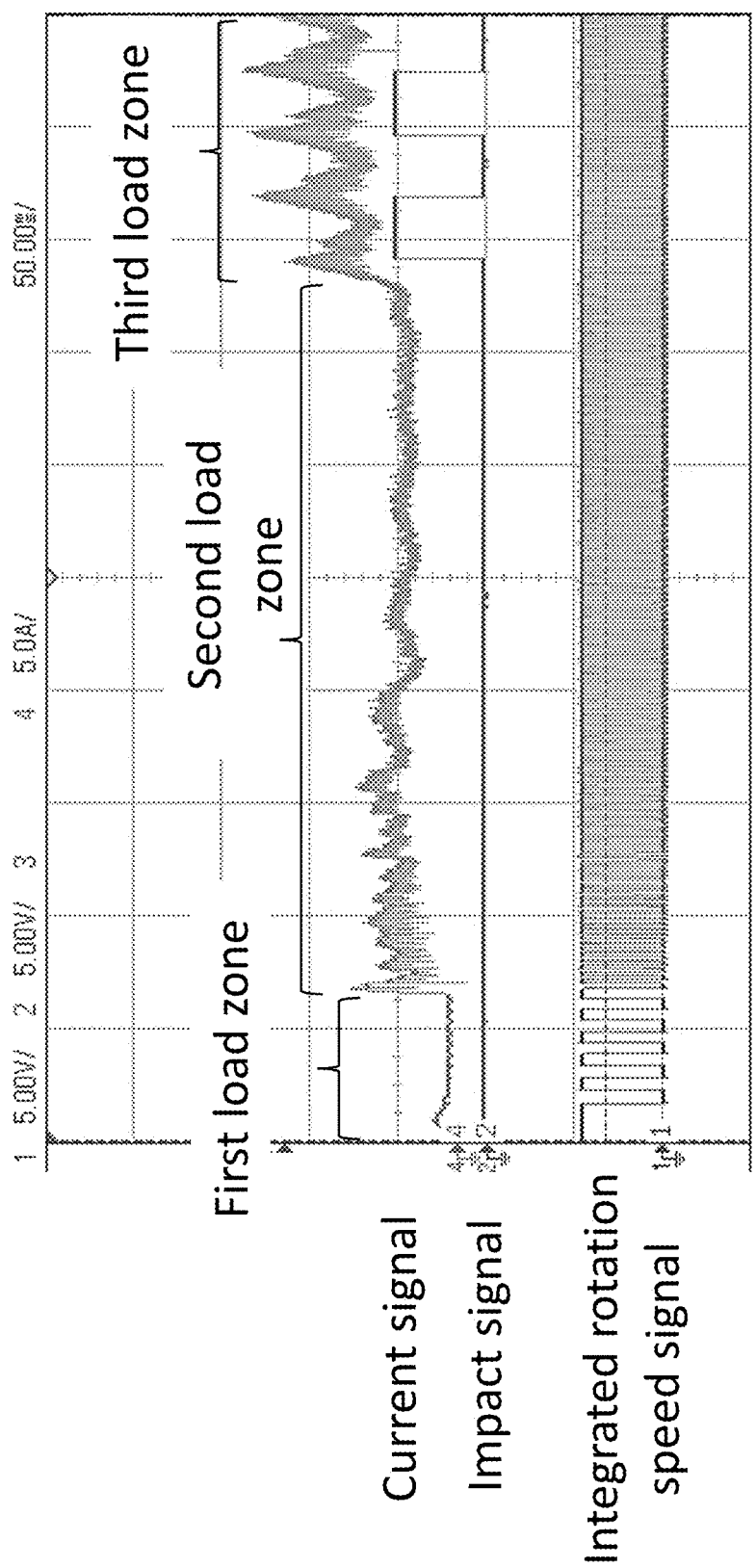
FIG. 5 is a waveform diagram of the impact power tool according to the first embodiment of the present invention.

Referring to FIG. 5, the process of a rotation of the motor 12 could be divided into a first load zone, a second load zone, and a third load zone, wherein when at the first load zone, a rotation resistance of the motor 12 is smallest, and the motor current Im is smallest.

Step S12: continuously obtain the rotation speed signal based on a detecting result of the rotation speed detecting device 20 and obtain the current signal based on a detecting result of the current detecting device 22.

In the current embodiment, the first controller 182 continuously converts the original rotation speed signal detected by the rotation speed detecting device 20 into the integrated rotation speed signal.

Referring to FIG. 5, the rotation resistance of the motor 12 gradually increases as the workpiece is gradually fastened, at this time, when the user heavy presses the activating switch 322, the activating switch 322 outputs the second activating signal to the second controller 262, and the second controller 262 correspondingly outputs the pulse width modulation signal via the command transmission line 363, thereby making the first control device 18 to control the motor 12 to rotate at a fixed rotation speed, wherein at this time the process of a rotation of the motor 12 enters the second load zone. The fixed rotation speed is greater than the rotation speed of the motor 12 at the first load zone. When at the second load zone, the rotation speed gradually decreases and the motor current Im of the motor 12 gradually increases as the workpiece is gradually fastened.

The rotation resistance of the motor 12 gradually increases as the workpiece is gradually fastened, wherein entering the third load zone during the process of a rotation of the motor 12. When at the third load zone, the rotation speed of the motor 12 is much lower, and the motor current Im increases, and the impact mechanism 14 produces impact at the third load zone. How the first control device 18 determines that the impact mechanism 14 produces impact will be described in detail herein.

Step S13: the first control device 18 obtains a rotating time T of each rotation angle of the motor 12 based on a variation of the pulse waves of the rotation speed signal and obtains the motor current Im based on the current signal.

Referring to FIG. 3, a time difference between a time that the pulse wave of the output of one of the Hall detectors 202 varies and a time that the pulse wave of the output sensed by another one of Hall detectors 202 varies in the rotation speed signal is the rotating time T. In other words, the rotating time T is obtained through the variation of the pulse wave in the integrated rotation speed signal, wherein one cycle of the variation of the pulse wave in the integrated rotation speed signal has two continuous rotating times T, and the rotation angle that one cycle of the variation of the pulse wave in the integrated rotation speed signal corresponds is 120 degrees. We will take the rotating time T is obtained by the variation of the pulse wave in the integrated rotation speed signal as an example for illustration through the following paragraphs. However, this is not a limitation of the present invention, in other embodiments, the rotating time T of each rotation angle of the motor 12 could be obtained based on a variation of the outputs sensed by the three Hall detectors 202 in the original rotation speed signal.

Figure 6:
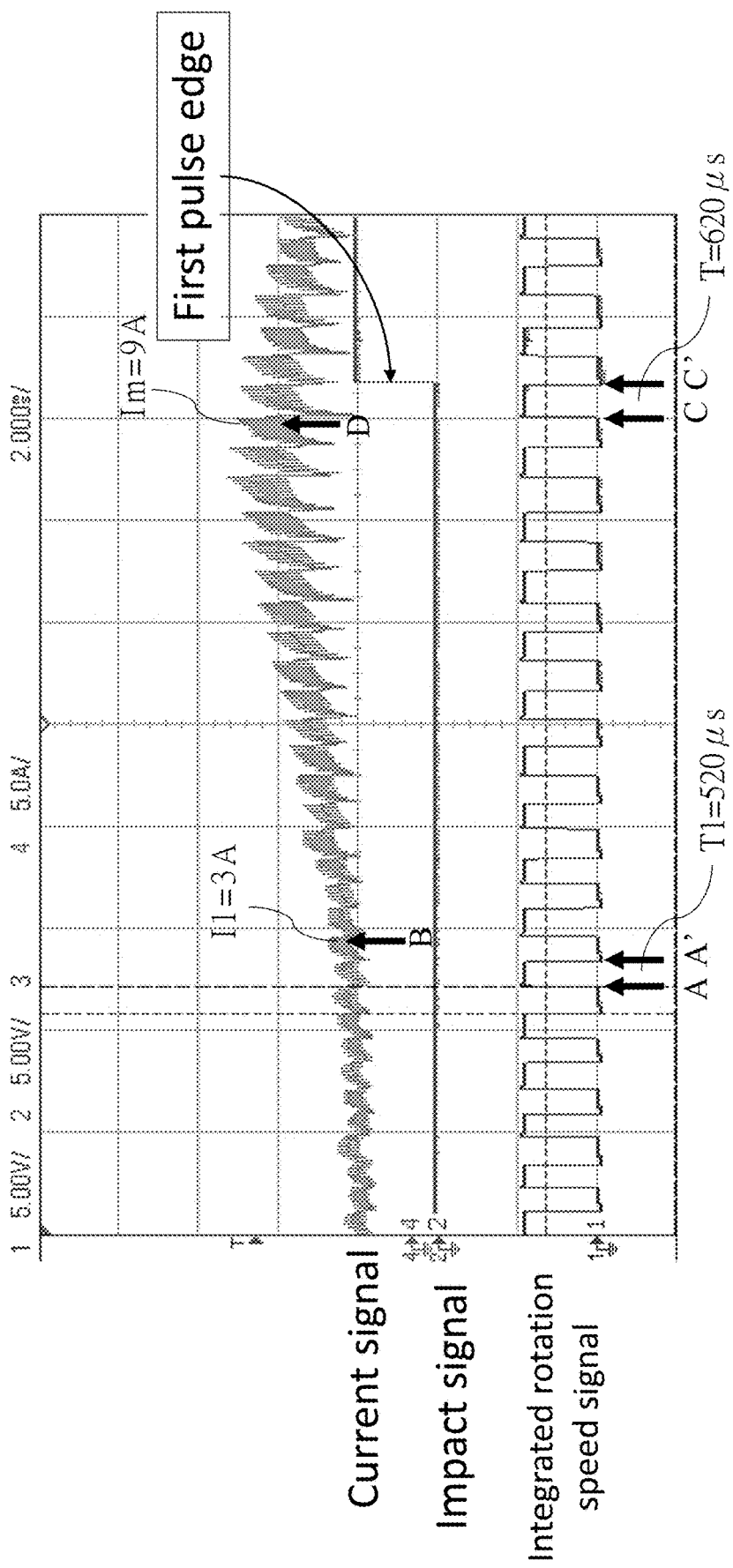
FIG. 6 is a waveform diagram of the impact power tool according to the first embodiment of the present invention.

Referring to FIG. 6, in the current embodiment, after the motor 12 rotates at the fixed rotation speed (i.e., in the second load zone), the first control device 18 takes the rotating time T of one of the pulse waves in the integrated rotation speed signal as a first base time T1 (e.g. the first base time T1 between an arrow A and an arrow A' in FIG. 6 is 520 µs) and takes the motor current Im of the current signal as a first base current I1 (e.g. the place pointed by arrow B in FIG. 6 is 3 A). The rotating time T and the first base time T1 could be, but not limited to, a time of a high voltage level between a rising edge and a falling edge as an example. In other embodiments, the rotating time T and the first base time T1 could be a time of a low voltage level between the falling edge and the rising edge.

In an embodiment, the first base time T1 and the first base current I1 could respectively be a time value and a current value predetermined by the first control device 18.

Step S14: the first control device 18 determines that the impact mechanism 14 produces an impact based on a variation of the rotating time T and a variation of the motor current Im of the current signal, and the second control device 26 counts a number of impact.

Referring to FIG. 6, when the first control device 18 determines that the variation of the rotating time T and the variation of the motor current Im satisfy a first condition, the first control device 18 determines that the impact mechanism 14 produces a first impact, wherein the first condition is that a ratio of the obtained rotating time T (e.g. the rotating time T between an arrow C and an arrow C' in FIG. 6 is 620 µs) to the first base time T1 reaches a first ratio, and a ratio of the obtained motor current Im (e.g. the place pointed by arrow D in FIG. 6 is 9 A) to the first base current I1 reaches a second ratio.

In the current embodiment, the first base time T1 is 520 µs as an example, and the first ratio is 1.19 as an example. In other words, when the obtained rotating time T is more than 618.8 µs, the first ratio is reached. Preferably, the first ratio ranges between 1.1 and 1.25. In an embodiment, the first ratio ranges between 1.15 and 1.2.

In the current embodiment, the first base current I1 is 3 A as an example, and the second ratio is 3 as an example. In other words, when the obtained motor current Im is more than 9 A, the second ratio is reached. Preferably, the second ratio ranges between 1.5 and 4.5. In an embodiment, the second ratio ranges between 2.5 and 3.5. In an embodiment, the second ratio ranges between 2.8 and 3.2.

When the first condition is satisfied, the first control device 18 starts generating the impact signal, and converts the impact signal from a first voltage level, which is a low voltage level as an example, into a second voltage level, which is a high voltage level as an example, thereby to form a first pulse edge of an impact pulse wave of the impact signal.

Figure 7:
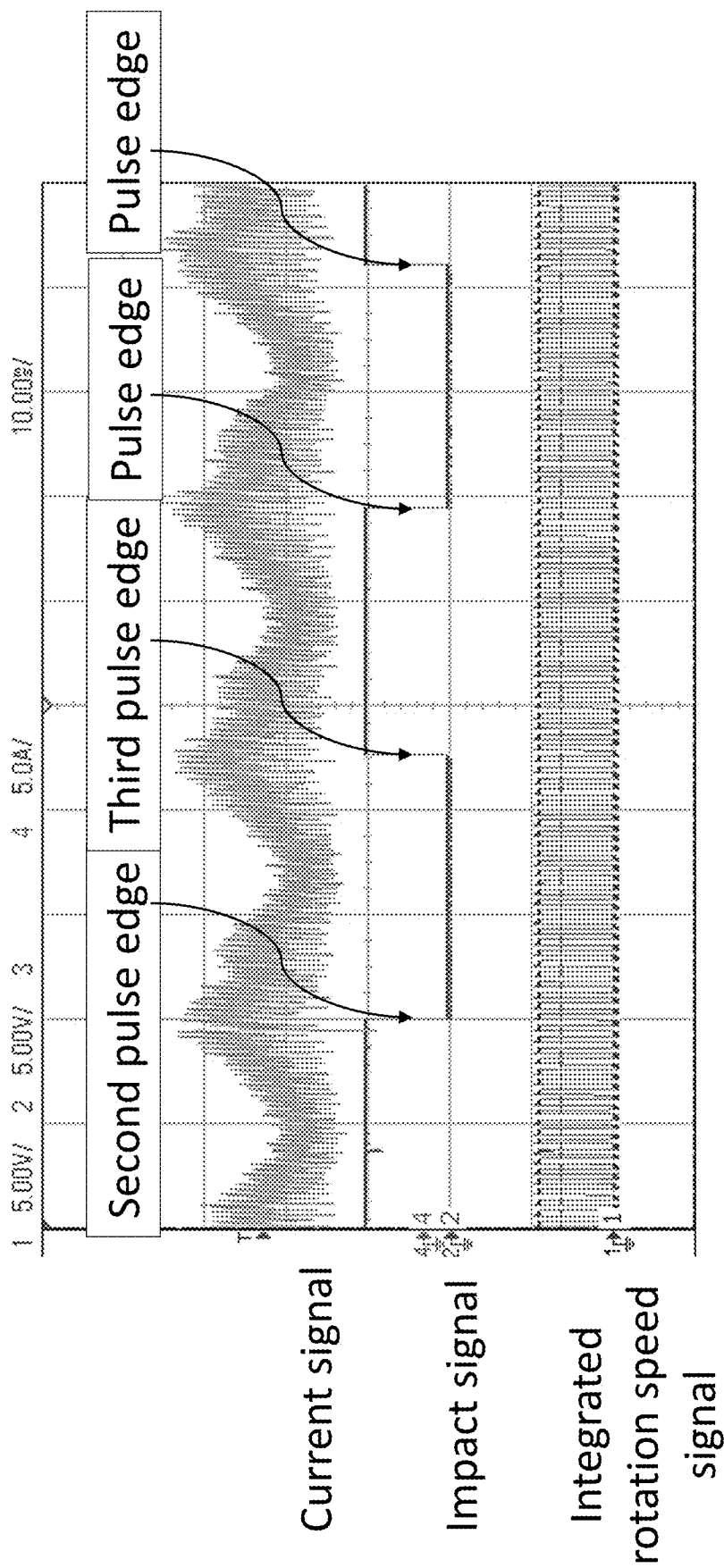
FIG. 7 is a waveform diagram of the impact power tool according to the first embodiment of the present invention.
Figure 8:
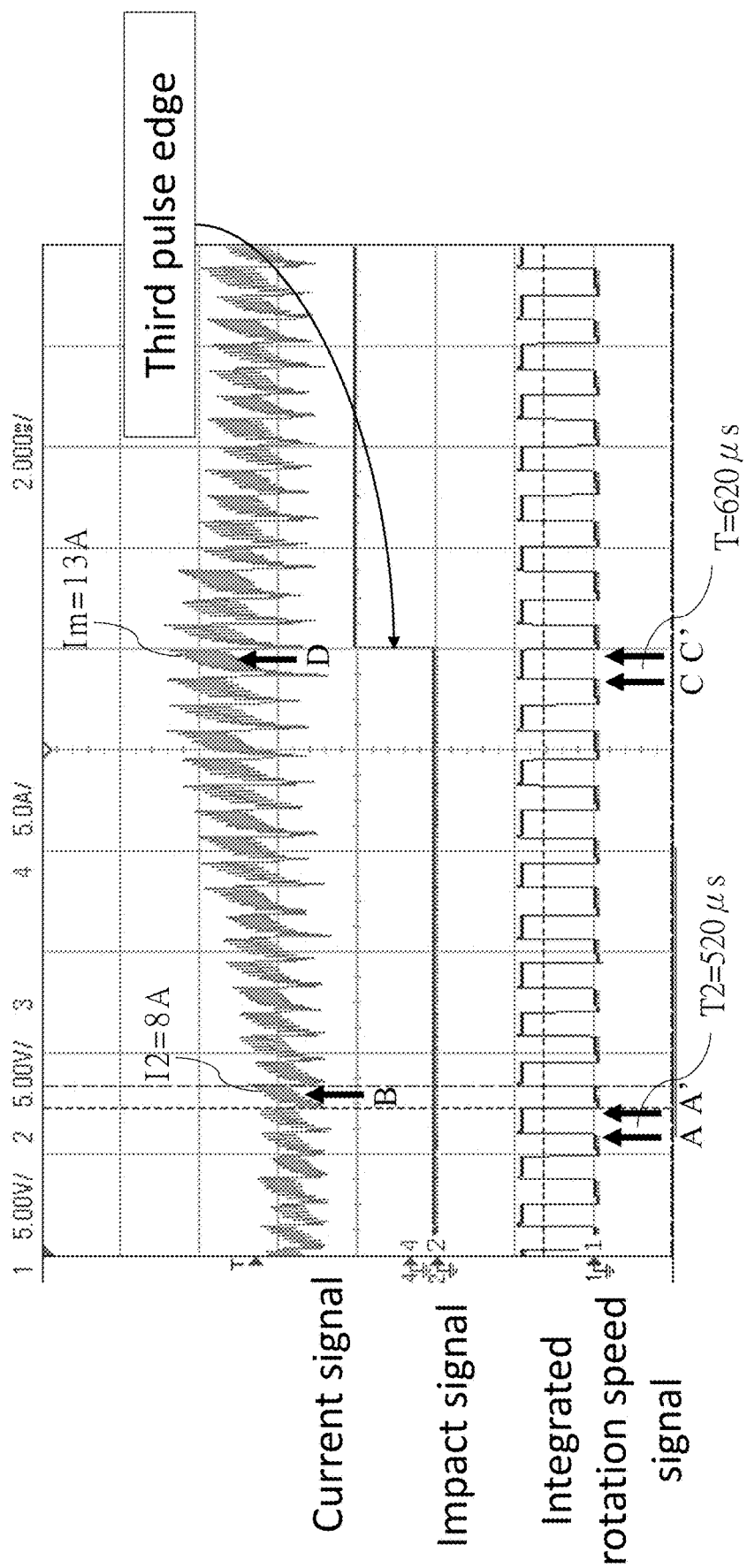
FIG. 8 is a waveform diagram of the impact power tool according to the first embodiment of the present invention.

Referring to FIG. 7 and FIG. 8, FIG. 7 is a waveform diagram after a second pulse edge is generated, and FIG. 8 is a waveform diagram after a third pulse edge is generated. Although FIG. 8 takes that the third pulse edge is generated as an example, the second pulse edge is formed by the same steps as that of the third pulse edge, wherein the difference between the second pulse edge and the third pulse edge is that the pulse edge is the rising edge or the falling edge. In the current embodiment, after the impact mechanism 14 produces the first impact, the first control device 18 takes the rotating time T of one of the pulse waves in the integrated rotation speed signal as a second base time T2 (e.g. the rotating time T between an arrow A and an arrow A' in FIG. 8), and takes the motor current Im of the current signal as a second base current I2 (e.g. the place pointed by arrow B in FIG. 8 is 8 A). Since the process of a rotation of the motor 12 has entered the third load zone, the obtained second base current I2 will be greater than the first base current I1.

In an embodiment, the second base time T2 could use the first base time T1, and the second base current I2 could use the first base current I1, so the steps of obtaining the second base time T2 and the second base current I2 could be omitted. In an embodiment, the second base time T2 and the second base current I2 could be respectively a time value and a current value predetermined by the first control device 18.

After the impact mechanism 14 produces the first impact, every time a second condition is satisfied, the first control device 18 transforms a voltage level of the impact signal (i.e., transform the impact signal from either the first voltage level or the second voltage level into the other), thereby forming other pulse edges of the impact pulse wave of the impact signal (i.e., the pulse edges after the second pulse edge).

The second condition is that a ratio of the obtained rotating time T (e.g. the rotating time T between an arrow C and an arrow C' in FIG. 8 is 620 µs) to the second base time T2 reaches a third ratio, and a ratio of the motor current Im (e.g. the place pointed by arrow D in FIG. 8 is 13 A) to the second base current I2 reaches a fourth ratio.

In the current embodiment, the second base time T2 is 520 µs as an example, and the third ratio is 1.19 as an example. In other words, when the obtained rotating time T is more than 618.8 µs, the third ratio is reached. Preferably, the third ratio ranges between 1.1 and 1.25. In an embodiment, the third ratio ranges between 1.15 and 1.2.

In the current embodiment, the second base current I2 is 8 A as an example, and the fourth ratio is 1.625 as an example. In other words, when the obtained motor current Im is more than 13 A, the fourth ratio is reached. Preferably, the fourth ratio ranges between 1.5 and 4.5. In an embodiment, the fourth ratio ranges between 1.5 and 2. In an embodiment, if the second base current I2 uses the first base current I1, the fourth ratio ranges between 3 and 4.5, for example, 4.33 (i.e., 13 A/3 A).

In this way, the first control device 18 could generate the impact signal having several impact pulse waves, and each of the pulse edges (e.g. the rising edge or the falling edge) of each of the impact pulse waves corresponds to that the impact mechanism 14 produces one impact. The impact signal is transmitted to the second control device 26 via the feedback signal line 365. The second control device 26 could determine the number of impact based on a number of the pulse edge of the impact signal.

Step S15: the second control device 26 receives the impact signal via the feedback signal line 365 and determines the number of the pulse edge of the impact signal. For example, count the number of pulse edges as the number of impacts. The second controller 262 of the second control device 26 compares that whether the number of impact reaches the corresponding one of the predetermined number obtained in step S11.

If the number of impact has not reached the corresponding one of the predetermined numbers obtained in step S11, keep the motor 12 continuing to rotate.

If the number of impact reaches the corresponding one of the predetermined numbers obtained in step S11, the braking command is outputted, wherein the braking command is transmitted to the first control device 18 via the brake signal line 364. After the first control device 18 receives the braking command, the first control device 18 controls the motor 12 to stop rotating.

In summary, the control method of the impact power tool 1 of the current embodiment could accurately determine the number of impact that the impact mechanism 14 produces based on the motor current Im and the rotating time T of the rotation speed signal and could control the motor 12 to stop rotating when the number of impact reaches the corresponding one of the predetermined number which is required, thereby accurately control an output torque outputted by the impact power tool 1.

Another embodiment is provided below, which could also achieve the effect of accurately controlling the torque output by the impact power tool.

Figure 9:
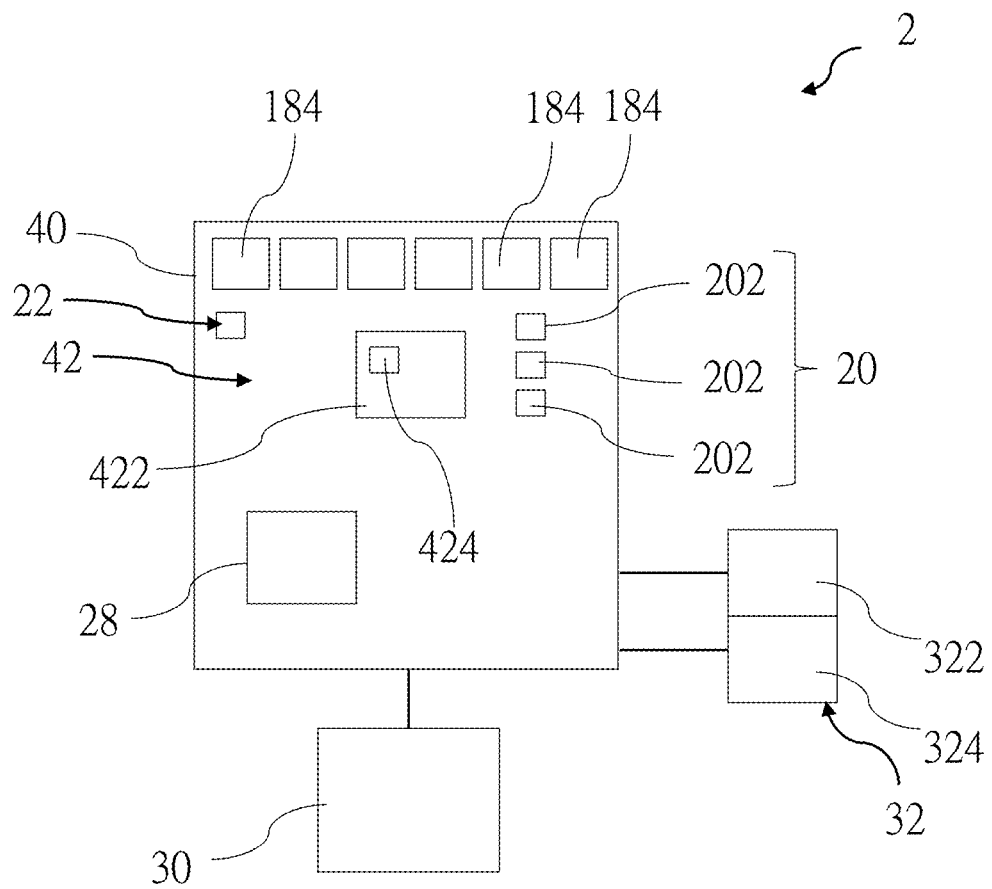
FIG. 9 is a schematic view of the impact power tool according to a second embodiment of the present invention.

An impact power tool 2 according to a second embodiment of the present invention is illustrated in FIG. 9, which has almost the same structures as that of the first embodiment, except that in the current embodiment, the impact power tool 2 includes a circuit board 40, wherein a control device 42, the rotation speed detecting device 20, and the current detecting device 22 are disposed on the circuit board 40. The control device 42 includes a controller 422 and the commutation switching elements 184, wherein the controller 422 could be a microcontroller. The controller 422 is electrically connected to the commutation switching elements 184.

The circuit board 40 is electrically connected to the battery 30 and the operation interface 32, and the monitor 28 is disposed on the circuit board 40. The operation interface 32 is electrically connected to the control device 42 and includes the activating switch 322 and the level selecting device 324.

The control device 42 includes a storage unit 424 which is a built-in memory of the controller 422, wherein the storage unit 424 stores a plurality of predetermined numbers respectively corresponding to the torque levels.

Figure 10:
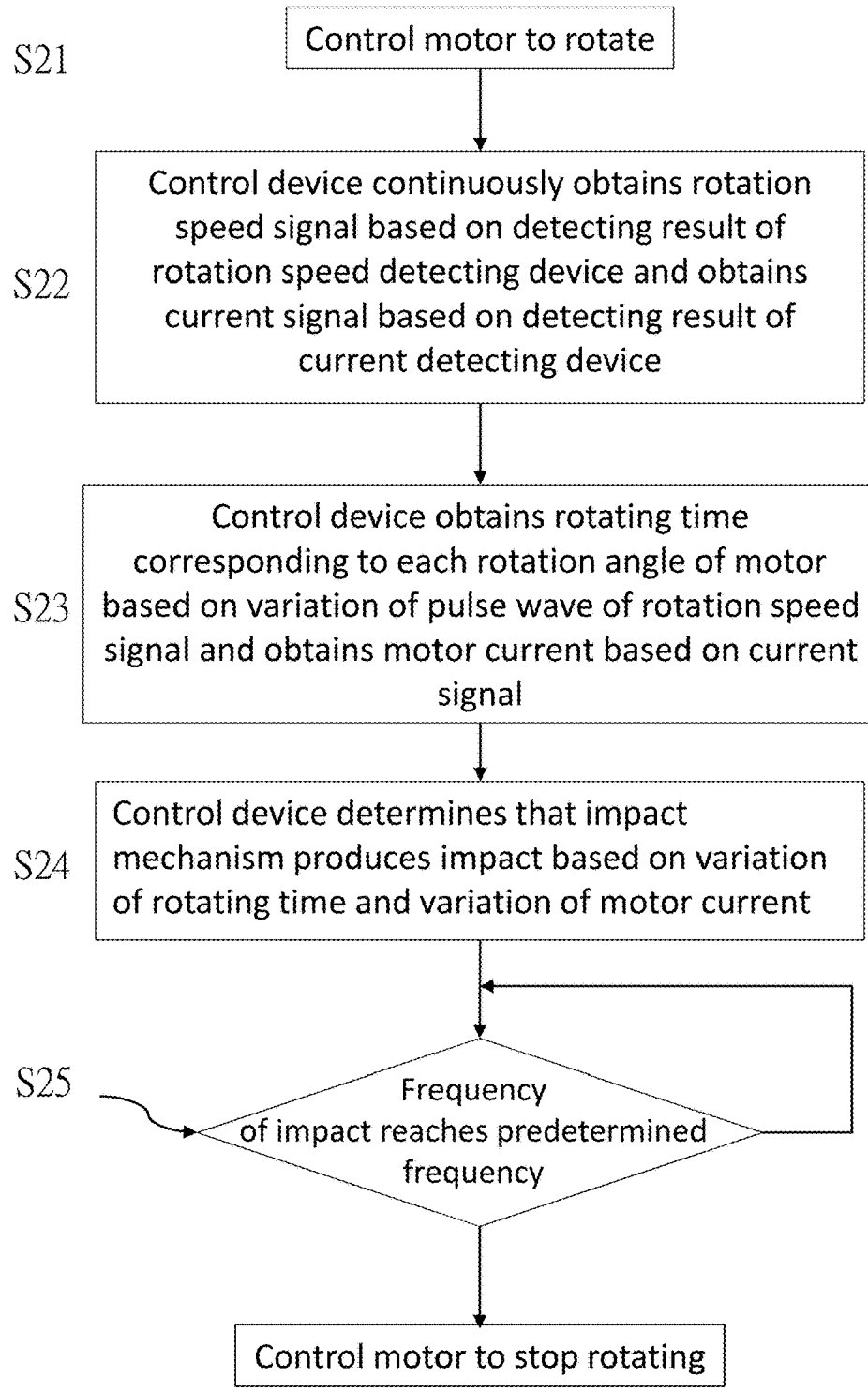
FIG. 10 is a flowchart of the control method of the impact power tool according to the second embodiment of the present invention.

With the aforementioned structures of the impact power tool 2, a control method shown in FIG. 10 could be applied, wherein the control method includes following steps.

Step S21: control the motor 12 to rotate. In the current embodiment, the user operates the operation interface 32 to select the required one of the torque levels through the level selecting device 324, and the level selecting device 324 correspondingly outputs the level selecting signal to the control device 42. The controller 422 retrieves the corresponding one of the predetermined numbers from the storage unit 424 based on the required torque level.

After the user lightly presses the activating switch 322, the activating switch 322 outputs the first activating signal to the controller 422, and the controller 422 controls the motor 12 to rotate by controlling the commutation switching elements 184. At this time, the rotating shaft 122 of the motor 12 drives the impact mechanism 14 to rotate, and the output shaft 142 drives the workpiece to rotate.

Step S22: the control device 42 continuously obtains the rotation speed signal based on a detecting result of the rotation speed detecting device 20 and obtains the current signal based on a detecting result of the current detecting device 22.

Step S22 of the current embodiment is almost the same as step S12 of the first embodiment, except that the original rotation speed signal does not be converted into the integrated rotation speed signal.

After the user heavy presses the activating switch 322, the activating switch 322 outputs the second activating signal to the controller 422, and the controller 422 controls the commutation switching elements to make the motor 12 rotate at a fixed rotation speed.

Step S23: the control device 42 obtains a rotating time T of each rotation angle of the motor 12 based on a variation of the pulse waves of the original rotation speed signal and obtains the motor current Im based on the current signal.

Figure 11:
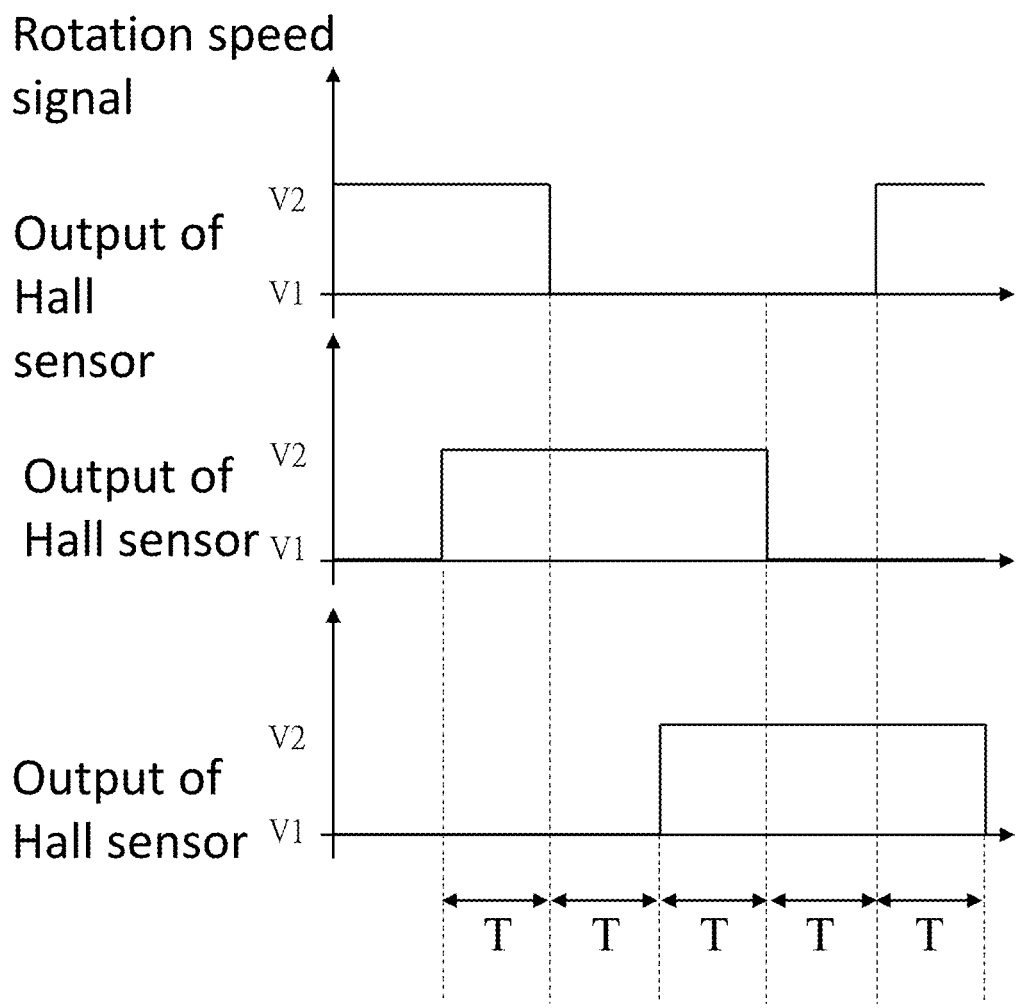
FIG. 11 is a waveform diagram of the rotation speed signal according to the second embodiment of the present invention.

Referring to FIG. 11, since the same control device 42 performs control in the current embodiment, the difference between the control method of the current embodiment and that of the first embodiment is that the rotating time T of each rotation angle of the motor 12 is obtained based on a variation of the pulse wave of the outputs sensed by the three Hall detectors 202 in the original rotation speed signal, wherein the time difference between a time that the pulse wave of the output of one of the Hall detectors 202 varies and a time that the pulse wave of the output sensed by another one of Hall detectors 202 varies is the rotating time T.

After the motor 12 rotates at the fixed rotation speed, the control device 42 takes one of the rotating times T in the rotation speed signal as a first base time T1 and takes the motor current Im in the current signal as a first base current I1, wherein the way of obtaining the first base time T1 and the first base current I1 is the same as that of the first embodiment.

Step S24: the control device 42 determines that the impact mechanism 14 produces an impact and a number of impact based on a variation of the rotating time T of the rotation speed signal and a variation of the motor current Im of the current signal.

Step S24 of the current embodiment is almost the same as step S14 of the first embodiment, which also determines that the impact mechanism 14 produces a first impact when a first condition is satisfied, wherein the first condition is that a ratio of the obtained rotating time T to the first base time T1 reaches a first ratio, and a ratio of the motor current Im to the first base current I1 reaches a second ratio.

Additionally, the difference between step S24 of the current embodiment and step S14 of the first embodiment is that the control device 42 does not generate the impact signal.

After that, determine at least one impact that the impact mechanism 14 produces after the first impact when the second condition is satisfied, wherein the second condition is that a ratio of the obtained rotating time T to the second base time T2 reaches a third ratio, and a ratio of the motor current Im to the second base current I2 reaches a fourth ratio; the way of obtaining the second base time T2 and the second base current I2 is the same as that of the first embodiment.

Step S25: the controller 422 of the control device 42 counts the number of impact and compares that whether the number of impact reaches the predetermined numbers.

If the number of impact has not reached the predetermined numbers, keep the motor 12 continuing to rotate.

If the number of impact reaches the predetermined numbers, the motor 12 is controlled by the controller 422 to stop rotating.

With the aforementioned design, the control method of the current embodiment could control the motor 12 to stop rotating when the number of impact reaches the corresponding one of the predetermined numbers which is required, thereby accurately control an output torque outputted by the impact power tool 2 as well.

It must be pointed out that the embodiments described above are only some preferred embodiments of the present invention. All equivalent methods which employ the concepts disclosed in this specification and the appended claims should fall within the scope of the present invention.

What is claimed is:

1. A control method of an impact power tool, wherein impact power tool comprises a motor, an impact mechanism, a rotation speed detecting device, and a current detecting device; the impact mechanism is connected to the motor and is driven by the motor to rotate; the rotation speed detecting device is adapted to detect a rotation speed of the motor, and the current detecting device is adapted to detect a motor current when the motor operates; the control method comprises steps of:
   A. controlling the motor to rotate;
   B. continuously obtaining the rotation speed signal based on a detecting result of the rotation speed detecting device and obtaining the current signal based on a detecting result of the current detecting device, wherein the rotation speed signal has a plurality of pulse waves corresponding to a plurality of rotation angles of the motor; obtaining a rotating time of each of the rotation angles of the motor based on a variation of the pulse waves and obtaining the motor current based on the current signal;

C. determining that the impact mechanism produces an impact based on a variation of the rotating time of the rotation speed signal and a variation of the motor current of the current signal, and obtaining a number of impact by summing the impacts that the impact mechanism produces; and D. stopping the motor from rotating when the number of impact reaches a predetermined number.

2. The control method as claimed in claim 1, wherein in step C, comprising a step of determining that the impact mechanism produces a first impact, wherein when a first condition is satisfied, determining that the impact mechanism produces the first impact; the first condition is that a ratio of the obtained rotating time to a first base time reaches a first ratio, and a ratio of the motor current to a first base current reaches a second ratio.

3. The control method as claimed in claim 2, wherein in step C, comprising a step of generating an impact signal; the impact signal comprises a plurality of impact pulse waves; a pulse edge of each of the impact pulse waves corresponds that the impact mechanism produces one impact; in step D, a number of the pulse edge of the impact signal is used as the number of impact.

4. The control method as claimed in claim 3, wherein in step C, the impact signal is generated by a first control device, and the impact signal is transmitted to a second control device via a first transmission line; in step D, the second control device compares the number of the pulse edge of the impact signal, which is received, and the predetermined number; when the number of impact reaches the predetermined number, the second control device transmits a braking command to the first control device via a second transmission line, and the first control device controls the motor to stop rotating.

5. The control method as claimed in claim 3, wherein in the step of determining that the impact mechanism produces the first impact in step C, comprising a step of converting the impact signal from a first voltage level into a second voltage level when the first condition is satisfied, thereby forming a first pulse edge of the impact signal.

6. The control method as claimed in claim 5, wherein after the step of determining that the impact mechanism produces the first impact in step C, comprising a step of converting the impact signal from either the first voltage level or the second voltage level into the other when a second condition is satisfied, thereby forming other pulse edges of the impact signal; the second condition is that a ratio of the obtained rotating time to a second base time reaches a third ratio, and a ratio of the motor current to a second base current reaches a fourth ratio.

7. The control method as claimed in claim 6, wherein after the step of determining that the impact mechanism produces the first impact in step C, comprising a step of taking the motor current of the current signal as the second base current.

8. The control method as claimed in claim 6, wherein the second base current is greater than the first base current.

9. The control method as claimed in claim 2, wherein after the step of determining that the impact mechanism produces the first impact in step C, comprising a step of determining that the impact mechanism produces impact when a second condition is satisfied; the second condition is that a ratio of the obtained rotating time to a second base time reaches a third ratio, and a ratio of the motor current to a second base current reaches a fourth ratio.

10. The control method as claimed in claim 9, wherein after the step of determining that the impact mechanism produces the first impact in step C, comprising a step of taking the motor current of the current signal as the second base current.

11. The control method as claimed in claim 9, wherein second base current is greater than the first base current.

12. The control method as claimed in claim 2, wherein in step A, controlling the motor to rotate at a fixed rotation speed.

13. The control method as claimed in claim 12, wherein after step B, comprising a step of taking the rotating time of one of the rotation angles in the rotation speed signal as the first base time and taking the motor current of the current signal as the first base current after the motor rotates at the fixed rotation speed.

* * * * *